United States Patent
Gindele et al.

(10) Patent No.: US 7,389,041 B2
(45) Date of Patent: Jun. 17, 2008

(54) DETERMINING SCENE DISTANCE IN DIGITAL CAMERA IMAGES

(75) Inventors: Edward B. Gindele, Rochester, NY (US); Andrew C. Gallagher, Brockport, NY (US); Amy D. Enge, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 341 days.

(21) Appl. No.: 11/048,463

(22) Filed: Feb. 1, 2005

(65) Prior Publication Data

US 2006/0171566 A1  Aug. 3, 2006

(51) Int. Cl.
*G03B 41/00* (2006.01)
*G06K 9/40* (2006.01)

(52) U.S. Cl. .................. 396/98; 396/106; 348/135; 348/370

(58) Field of Classification Search ............. 396/106, 396/109, 98; 348/370, 371; 356/3, 4.07
See application file for complete search history.

(56) References Cited

U.S. PATENT DOCUMENTS 6,792,205 B2 * 9/2004 Frisken et al. ............. 396/138
6,856,355 B1 * 2/2005 Ray et al. .................. 348/370
7,006,142 B2 * 2/2006 Seo ........................... 348/370
2003/0197806 A1 10/2003 Perry et al.

OTHER PUBLICATIONS

"Multiple View Geometry in Computer Vision" by Richard Hartley et al., Second Edition, Cambridge Univesity Press, March 2004.

* cited by examiner

*Primary Examiner*—W. B. Perkey
(74) *Attorney, Agent, or Firm*—Raymond L. Owens

(57) ABSTRACT

A method for producing a distance map of scene distance values for a digital image captured by a digital camera includes capturing a first digital image of a scene under a first illumination condition, wherein the first digital image includes a plurality of pixels and the scene includes a plurality of scene objects located at different distances from the digital camera, capturing a second digital image of the scene under a second illumination condition that is different from the first illumination condition, and using the first and second digital images to produce a distance map having a plurality of scene distance values, wherein each scene distance value relates to the distance between the digital camera and the corresponding scene object.

3 Claims, 3 Drawing Sheets

DETERMINING SCENE DISTANCE IN DIGITAL CAMERA IMAGES

FIELD OF THE INVENTION

The invention relates generally to the field of digital image processing, and in particular to distance detection of different locations in a scene in digital images captured by digital cameras.

BACKGROUND OF THE INVENTION

Scene object geometry, i.e. the geometric distribution and relationship, for natural scene photography is valuable information that can be used to process digital images produced by digital cameras. In particular, knowing the separation distance between the camera and scene object along the line-of-sight from camera to object can be used to calculate the separation distance from object to object within the scene.

There are examples of semi-manual and automatic prior art in this field. In "Multiple View Geometry in Computer Vision Second Edition," Cambridge University Press, March 2004, R. Hartley, et al. disclose several methods for determining 3D information (and hence distance information) from a 2D image. One method is accomplished by taking several captures of a scene from different viewing angles. Through user intervention of assigning geometric structures to certain features in the image, the Euclidean 3D geometry of the scene can be derived. According to Hartley, by using techniques of projective geometry, it is possible in many instances to reconstruct scenes from a single image. This cannot be done without some assumptions being made about the imaged scene (e.g. the physical distance between at least two imaged points should be known). It is not yet possible for such techniques to be fully automatic. However, projective geometric knowledge can be built into a system that permits user-guided single-view reconstruction of a scene. A further method described by Hartley requires that all points of the scene are visible in all images.

A significant problem with existing distance measurement methods is that they require considerable processing to determine distance. These methods often require user intervention as well as specific setups for the capture of the image. In addition, these methods are often very computationally intensive and complex.

SUMMARY OF THE INVENTION

It is an object of the present invention to produce a distance map of scene objects located at different distances from a camera.

This object is achieved by a method for producing a distance map of scene distance values for a digital image captured by a digital camera, comprising:

a) capturing a first digital image of a scene under a first illumination condition, wherein the first digital image includes a plurality of pixels and the scene includes a plurality of scene objects located at different distances from the digital camera;

b) capturing a second digital image of the scene under a second illumination condition that is different from the first illumination condition; and c) using the first and second digital images to produce a distance map having a plurality of scene distance values, wherein each scene distance value relates to the distance between the digital camera and the corresponding scene object.

It is a feature of the present invention that it provides an improved, automatic, computationally efficient way to determine scene distance values related to distances of the different locations in the scene from the digital camera. This feature is achieved by capturing multiple images of a scene by a single digital camera. The multiple images are captured using different light sources. The inverse square law dependence on distance for flash illumination light sources is advantageously used in developing the distance map.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components, and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably used on any well known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
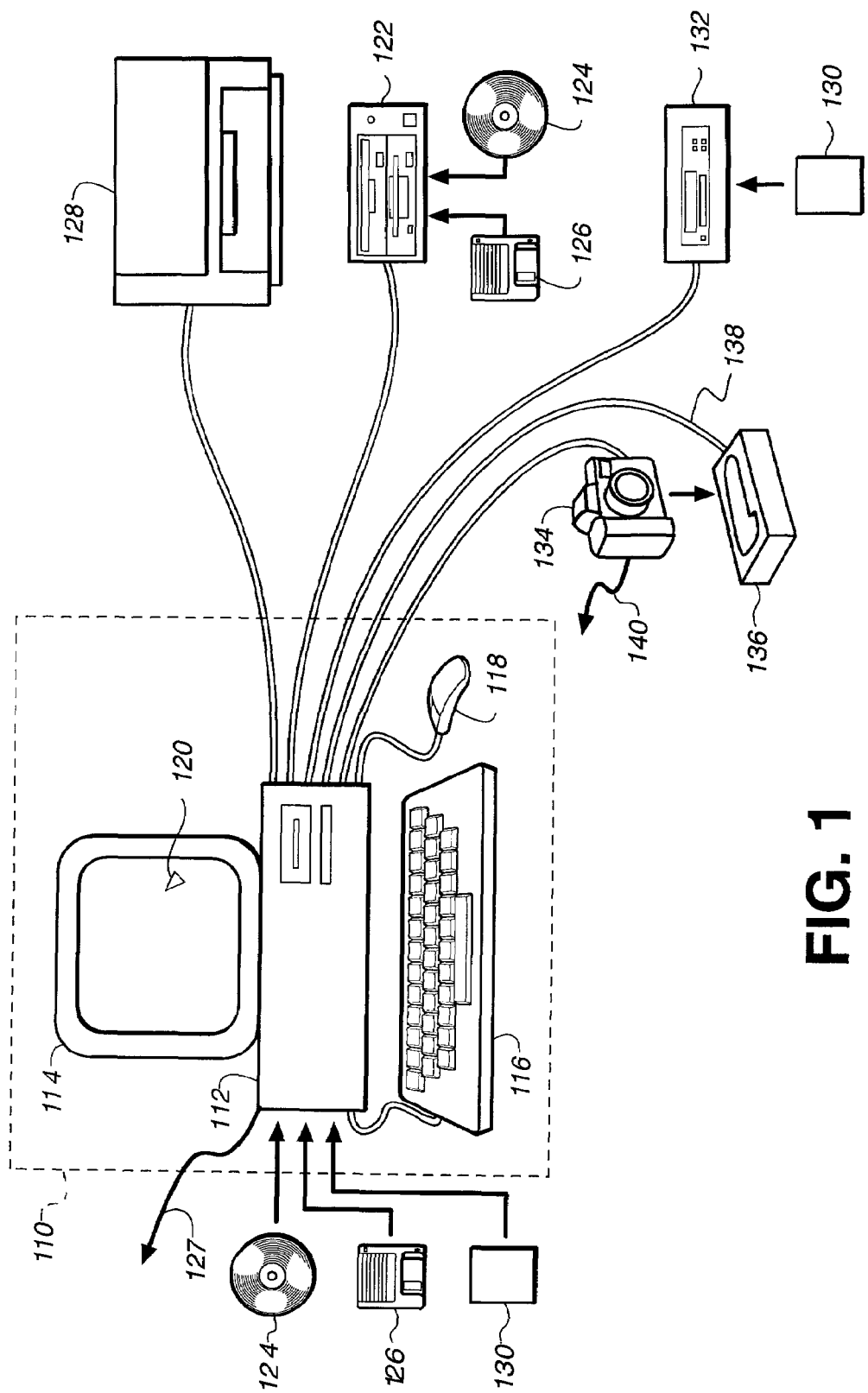
FIG. 1 is a block diagram depicting a computer system suitable for practicing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by way of a graphical user interface. A keyboard 116 is also connected to the microprocessor-based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor-based unit for providing a way of inputting the software programs and other information to the microprocessor-based unit 112. In addition, a floppy disk 126 can also include a software program, and is inserted into the microprocessor-based unit 112 for inputting the software program. The CD-ROM 124 or the floppy disk 126 can alternatively be inserted into externally located disk drive unit 122 that is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130 such as, as it was formerly known, a PCMCIA card (based on the specifications of the Personal Computer Memory Card International Association) that contains digitized images electronically embodied in the PC card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images can also be input via the CD-ROM 124, the floppy disk 126, or the network connection 127. Any images stored in the PC card 130, the floppy disk 126 or the CD-ROM 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to determine values related to distances of the different locations in the scene from the digital camera.

Figure 2:
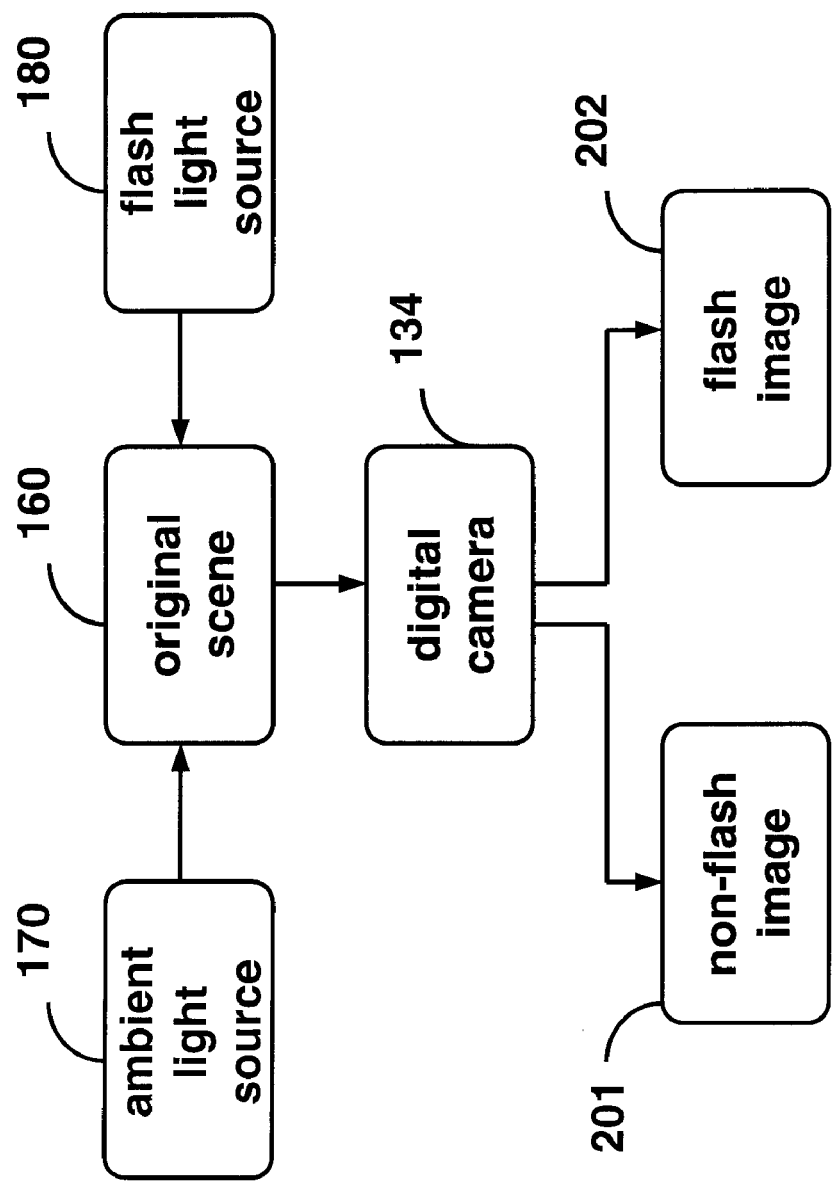
FIG. 2 is a functional block diagram showing the image capture scenario of an original scene, digital camera, and two light sources.

FIG. 2 depicts a typical imaging scenario involving a digital camera 134. An original scene 160 including a plurality of scene objects is illuminated by an ambient light source 170. The digital camera 134 can be used to record the original scene 160 in the form of a digital image. Thus, the three dimensional original scene 160 is captured and represented as a two dimensional digital image. In the present invention, a digital camera 134 is used to capture two digital images, each acquired with a different light source, i.e. different illumination conditions. The original scene 160 is assumed to be illuminated by an ambient light source 170. For indoor photography, the ambient light source 170 can be a fluorescent or incandescent light bulb. For outdoor photography, the ambient light source 170 can be a direct sunlight or diffuse sunlight from cloud cover. The digital image produced by a first capture with the ambient light source 170 is the non-flash digital image 201. An electronic flash unit is used as the second light source called the flash light source 180. The second capture by the digital camera 134 results in a second digital image labeled the flash digital image 202. Preferably, the non-flash digital image 201 is captured between $\frac{1}{15}$ and $\frac{1}{30}$ of a second prior to the flash digital image 202 in order to reduce a change in the scene between the two captures.

It is assumed that the ambient light source 170 is also used for the capture of the flash digital image 202. Therefore, the ambient light source 170 can be considered a first light source for which the non-flash digital image 201 is captured, and the combination of the ambient light source 170 and flash light source 180 together can be considered a second light source for which the flash digital image 202 is captured. It should also be noted that the additional light source, i.e. the flash light source 180 as described above, does not have to be produced by an electronic flash unit. For example, a second incandescent light bulb fixed to the digital camera 134 can be used as the additional light source. Thus, the additional light source is activated for the second image capture. Either a single light source or a combination of multiple light sources define an illumination condition.

It is assumed that the digital camera 134 position relative to the original scene 160 is approximately the same for the two captures. The present invention uses these two digital images to calculate a scene distance value for each pixel of the flash digital image 202 that corresponds to the separation distance along the line-of-sight from the camera to a place in the original scene 160. The calculated scene distance values constitute a distance image or distance map 203 (shown in FIG. 3) for the digital camera 134 to original scene 160 image capture scenario. Thus, there is calculated a scene distance value for each pixel of the distance map 203. The distance map 203 can then be analyzed to determine the distance of a scene object, e.g. a tree or wall, from the single point perspective of the digital camera. For example, the scene distance values recorded in the distance map 203 that correspond to a tree can be averaged to determine the camera-to-tree distance.

The original scene 160 includes a plurality of scene objects located at different distances from the digital camera 134. For example, an indoor scene can include a floor, walls, ceiling, furniture, and even the ambient light source. While conceptually, each of these items can be considered a scene object, it is also possible to consider each part of an object as a scene object. For example, the ceiling of a room can be considered an object, but so can the near part or the far part of the ceiling as well. Both the non-flash digital image 201 and the flash digital image 202 include a plurality of pixels. Each pixel of these two digital images corresponds to a part of a scene object. Thus, each pixel of the captured digital images has a corresponding scene object that is a measurable distance from the digital camera. The actual point on the digital camera 134 from which the distance is measured can be arbitrarily chosen to be the center of the front lens or, for example, the center photo site of the electronic sensor used to capture digital images. Thus, distance map 203 includes a plurality of scene distance values (pixel values), wherein each scene distance value relates to the distance between the digital camera 134 and a corresponding scene object or scene location. While it is true that every pixel of the distance map 203 has a corresponding scene location or scene object, it is, in general, not true that every scene object has a corresponding calculated scene distance value. For example, if a chair is facing the digital camera 134, the back of the chair cannot have a line-of-sight to the camera and hence not seen. However, each location or scene object within the original scene that does have a line-of-sight to the digital camera 134 can have a measurable scene distance value.

It is assumed that the ambient light source 170 evenly illuminates the scene objects of the original scene 160. For most photographed scenes this is a valid approximation. Therefore, two scene objects having different material reflectance values will result in different pixel values in the resulting captured digital camera image with the scene object having the lower material reflectance appearing darker (lower in pixel value). Two scene objects having about the same material reflectance value will have approximately the same corresponding pixel values in the non-flash digital image 201. This is true even if the two scene objects are located at different distances from the digital camera 134. Thus, for the non-flash digital image 201 captured with the ambient light source 170, differences in pixel values result primarily from changes in material reflectance. While this is generally true for pixels corresponding to scene objects directly illuminated by the ambient light source 170, it is not true for pixels corresponding to shadowed regions that are not illuminated by the ambient light source directly. Therefore, pixel value differences taken from a digital image captured with the ambient light source 170 arise from differences in material reflectance.

For the flash digital image 202, the pixel values corresponding to two scene objects of the same material reflectance value will only be the same when the objects are located about the same distance from the digital camera 134. If these two scene objects are located at different distances from the digital camera 134, the object further away will receive less light from the flash light source 180. Consequently, the corresponding pixel values in the flash digital image 202 will be numerically less (indicating less light received) than for the corresponding pixel values associated with the nearer scene object. The intensity of light received by scene objects within the original scene 160 is approximately inversely proportional to the square of the distance between the flash light source 180 and the scene object. If the flash light source 180 is fixed to the digital camera 134, then the scene object-to-light source distance is approximately the same as the scene object-to-camera distance. For two scene objects having different material reflectance values, the corresponding pixel values will be different when the two objects are located the same distance from the flash light source 180. Therefore, pixel value variation within a digital image captured with the flash light source 180 can arise from either a variation in camera-to-scene object distance or from material reflectance variation.

The present invention exploits the inherent inverse square distance relationship of the flash light source 180 and the inherent distance independent relationship of the ambient light source 170 to derive scene distance values for the pixels of both the non-flash digital image 201 or the flash digital image 202. This is accomplished by taking advantage of the fact that the material reflectance differences of scene objects are approximately the same for both the non-flash digital image 201 and the flash digital image 202. The angular sensitivity of the flash light source 180 is assumed to be isotropic, i.e. independent of orientation angle with respect to the three principle axes of the digital camera 134. Some electronic flash light sources can have an angular dependence. Those skilled in the art will appreciate that a compensation term can be included in the calculations since each pixel of the captured digital images would have a systematic angle relative to the camera.

For the non-flash digital image 201, the original scene 160 is assumed to be produced using the ambient light source 170. Mathematically, the pixel values $a_{ij}$ of the non-flash digital image 201 can be expressed by (1)

$$a_{ij} = A_{ij} MR_{ij} \qquad (1)$$

where $A_{ij}$ represents the ambient light source illumination level for the scene object corresponding to the $ij^{th}$ pixel, and $MR_{ij}$ represents the material reflectance of the scene object imaged corresponding to the $ij^{th}$ pixel. For the flash digital image 202, the original scene 160 is assumed to be produced including the ambient light source 170 and the flash light source 180. Mathematically, the pixel data can be expressed as (2)

$$b_{ij} = (A_{ij} + F_{ij}) MR_{ij} \qquad (2)$$

where $b_{ij}$ represents the $ij^{th}$ pixel value of the flash digital image 202 and $F_{ij}$ represents the flash light source illumination level for the scene object corresponding to the $ij^{th}$ pixel.

A digital image formed by just the flash illumination source can be obtained by subtracting the pixel values of the non-flash image 201 from the pixel values of the flash digital image 202 as given by (3)

$$c_{ij} = F_{ij} MR_{ij} \qquad (3)$$

where $c_{ij}$ represents the $ij^{th}$ pixel value of this calculated flash-only digital image. The material reflectance value $MR_{ij}$ can be removed from the equations by dividing the expression (3) by (1) to form (4)

$$q_{ij} = c_{ij}/a_{ij} = F_{ij}/A_{ij} \qquad (4)$$

where $q_{ij}$ represents the ratio of the flash-only to ambient pixel values. If the ambient light source 170 can be approximated by a constant $A_o$, i.e. spatially invariant distribution, then the term $q_{ij}$ will be proportional to spatial variation of the flash light source 180 which is determined by the scene distance values $D_{ij}$, or camera-to-scene object distance, as given by (5). The term $F_o$ is a term relating to the power emitted by the flash light source 180 and the F-number of the digital camera lens system $$F_{ij} = F_o/D_{ij}^2 \qquad (5).$$

With this approximation, the scene distance values $D_{ij}$ can be calculated as given by (6)

$$D_{ij} = \sqrt{F_o/(A_o q_{ij})} \qquad (6).$$

Calibrated scene distance values $D_{ij}$ can be calculated by determining the ambient illumination source constant $A_o$. One way to calculate $A_o$ is to average the values in the ambient non-flash digital image 201 as given by (7)

$$A_o = 5.5 \, \Sigma_{ij} a_{ij} \qquad (7)$$

wherein the constant 5.5 is approximately the reciprocal of 0.18, i.e. the average material reflectance value $MR_{ij}$. The scene distance values can also be calibrated using the camera lens focus distance $D_f$ as a reference distance. The quantity $D_f$ represents the camera-to-scene object distance for that is "in focus". The camera lens sub-system should itself be calibrated. Assuming that the center of the camera field of view corresponds to the $mn^{th}$ image pixel location and the camera lens is focused on the scene object corresponding to the $mn^{th}$ image pixel, then the scene distance values $D_{ij}$ are given by (8)

$$D_{ij}=\sqrt{K_o/q_{ij}} \quad (8)$$

where the constant $K_o$ is given by (9)

$$K_o=q_{mn}D_f^2 \quad (9).$$

Figure 3:
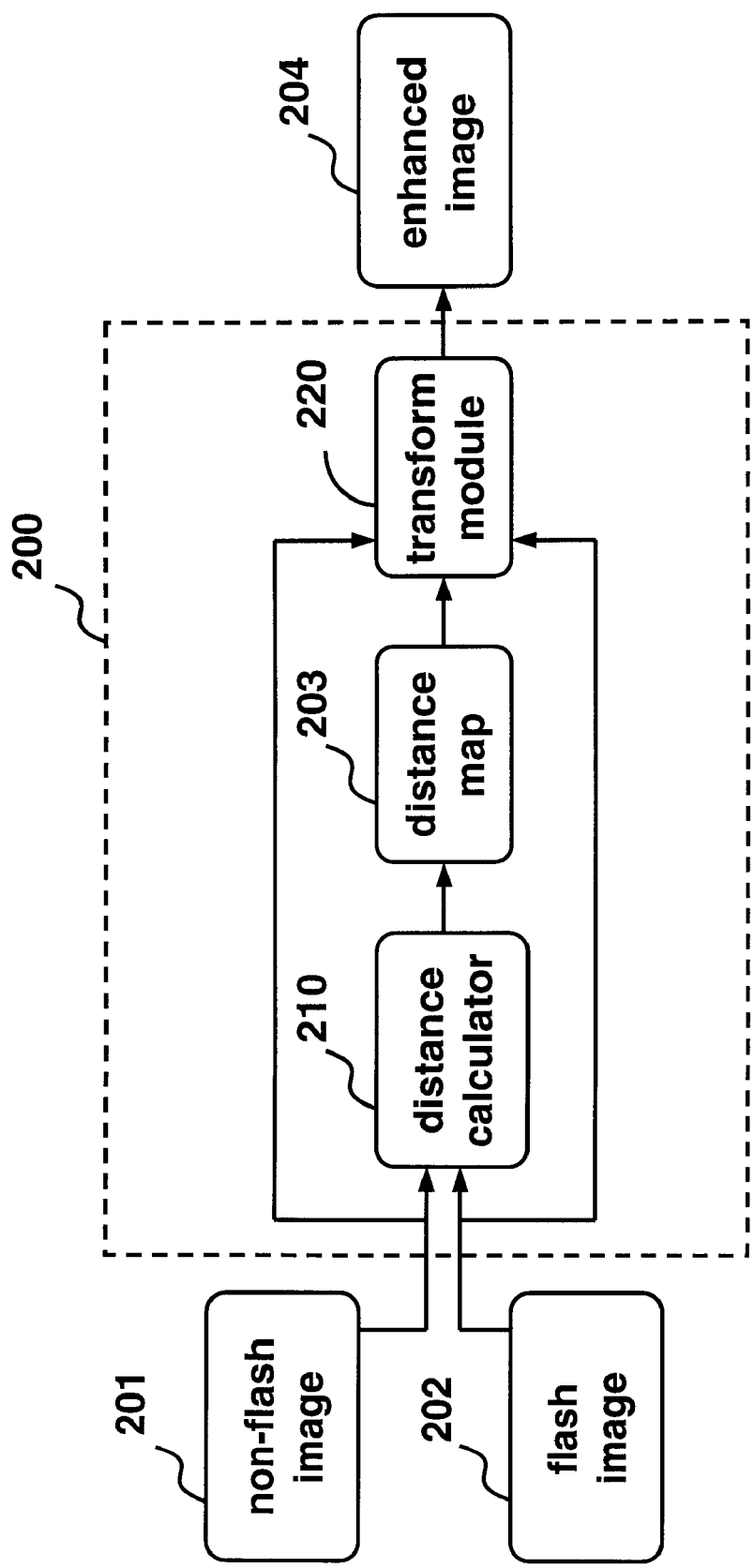
FIG. 3 is a block diagram of the image processing required for distance calculation.

FIG. 3 shows a functional block diagram of the image processor 200 that is part of the microprocessor-based unit 112 (shown in FIG. 1). It should also be noted that the image processor 200 can also be implemented as part of the digital camera 134. The distance calculator 210 receives both the non-flash digital image 201 and the flash digital image 202 and produces a distance map 203 by performing the calculations outlined in expressions (1) through (9) described above. Therefore, the distance map 203 includes of a scene distance values $D_{ij}$ corresponding to the $ij^{th}$ pixel in either the non-flash digital image 201 and the flash digital image 202. Within the image processor 200, the transform module 220 receives the distance map 203, and flash digital image 202 and uses the scene distance values to produce an enhanced digital image 204.

The derivation of expressions (1) through (9) described above are formulated in general terms. That is, these expressions can be used to describe the calculations for scene distance values $D_{ij}$ for any type of image pixel data. For example, if the digital camera 134 produces color digital images including red, green, and blue (RGB) pixel values, then scene distance values can be calculated individually using the red pixel values from the non-flash digital image 201 and the flash digital image 202. Similarly, scene distance values $D_{ij}$ can also be calculated using just the green or just the blue pixel values. Hence, three sets of scene distance values can be produced individually from the three separate color pixel values. Some digital cameras produce digital images with three color pixel values pertaining to cyan, magenta, and yellow. Similarly, scene distance values $D_{ij}$ can also be calculated using just the cyan, magenta, or just the yellow pixel values (CMY). For monochrome (black and white) digital images produced by a digital camera, scene distance values $D_{ij}$ can be calculated using monochrome pixel values. In similar fashion, a luminance pixel values can be calculated as in (10)

$$L_{ij}=0.30R_{ij}+0.59G_{ij}+0.11B_{ij} \quad (10)$$

where the terms $R_{ij}$, $G_{ij}$, and $B_{ij}$ represent $ij^{th}$ red, green, and blue pixel values respectively, and $L_{ij}$ represents the $ij^{th}$ luminance pixel value. A particularly useful implementation uses just the green pixel values $G_{ij}$ to calculate the scene distance values $D_{ij}$. This implementation is faster and particularly useful for in-camera applications since luminance pixel values do not have to be calculated.

It should be noted that the non-flash digital image 201 and flash digital image 202 should be registered prior to the computation of the scene distance values. Registering two images serves to align the images and remove gross pixel displacements due to positioning errors, for example, caused by hand shake. For example finding the maximum of the normalized cross-correlation between two digital images indicates the pixel offset of one image to the other. Other local registration techniques, such as optical flow or block matching techniques, can be used when objects in the scene can have moved in the time interval between the capture of the flash digital image 202 and the capture of the non-flash digital image 201.

Referring to FIG. 3, the transform module 220 uses the scene distance value of the distance map 203 to produce an enhanced digital image 204 from the either the non-flash digital image 201 or the flash digital image 202. For example, the scene distance values $D_{ij}$ can be used to modulate a blurring spatial filter applied to the pixels of the flash digital image 202. Expression (11) describes a generalized spatial filtering operation $$p'_{ij}=\Sigma_k \alpha_{mn} p_{mn} \quad (11)$$

wherein the term $p'_{ij}$ represents the $ij^{th}$ processed pixel value, $p_{mn}$ represents a pixel value in a local neighborhood about the $ij^{th}$ pixel, and $\alpha_{mn}$ represents a spatial weighting factor for the $p_{mn}$ pixel value. Thus, the spatial weighting factor $\alpha_{mn}$ can be formed as a function of the scene distance values $Z'_{ij}$ as given by (12) and (13)

$$\alpha_{mn}=e^{((m-i)^2+(n-j)^2)2\sigma^2} \quad (12)$$

$$\sigma=0.5 \text{ when } t_1<=Z'_{ij}>=\tau_2 \quad (13)$$

$$\sigma=2.0 \text{ when } t_1>Z'_{ij} \text{ or } Z'_{ij}<\tau_2$$

where $\tau_1$ and $\tau_2$ represent a distance threshold values and $\sigma$ represents a control parameter that determines the spatial extend of the blurring operation. The digital camera 134 provides a camera lens focus distance $D_f$ corresponding to the distance the camera lens was set to for the capture of the flash digital image 202. The distance threshold values are set based on the camera lens focus setting parameter as per expression (14)

$$t_1=D_f-\epsilon \quad (14)$$

$$t_2=D_f+\epsilon$$

where $\epsilon$ represents a tolerance value. The pixels of the enhanced digital image 204 will be blurred significantly for pixels that have a corresponding scene distance value $D_f$ that lie outside the $\epsilon$ tolerance value.

While expressions (12) through (14) describe one method for varying a spatial filter as a function of the calculated scene distance values, those skilled in the art will recognize that other functional forms can be used in concert with the present invention. For example, the control parameter $\sigma$ can be formulated as an analytical function of the scene distance values $D_{ij}$. Similarly, the form for $\sigma$ can have more than one range of distances for which significantly less blurring is performed. This can be accomplished by have a second set of distance threshold parameters. In this scenario, image pixels corresponding to scene objects that are close or far from the camera incur very little or no blurring while image pixels corresponding to scene objects in between near and far are be blurred significantly. Expression (15) describes the near-far scenario $$\sigma=0.5 \text{ when } t_1<=Z'_{ij}>=\tau_2 \quad (15)$$

$$\sigma=0.5 \text{ when } Z'_{ij}>=\tau_3$$

$$\sigma=2.0 \text{ otherwise.}$$

The operation of modulating a blurring operation based on the distance map 203, as described by expressions (12)

through (14), produces enhanced digital images 204 that appear to have been captured by a digital camera with a different F-number. In particular, the enhanced digital image 204 will appear to have been taken with a lower F-number. When the blurring operation is based on expressions (12), (14), and (15), the processed enhanced digital image 204 does not readily correspond to a physically realizable effect that can be produced with a conventional camera.

The distance detection algorithm disclosed in the preferred embodiment(s) of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better, or even just to change them), digital fulfillment (digital images in, from media or over the web, digital processing, with images out, in digital form on media, digital form over the web, or printed on hardcopy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the distance detection algorithm can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, can have user input (be fully or partially manual), can have user or operator review to accept/reject the result, or can be assisted by metadata (metadata that can be user supplied, supplied by a measuring device, e.g. in a camera, or determined by an algorithm). Moreover, the algorithm can interface with a variety of workflow user interface schemes.

The distance detection algorithm disclosed herein in accordance with the invention can have interior components that use various data detection and reduction techniques (e.g., face detection, eye detection, skin detection, flash detection).

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

Parts List 110 computer system
112 microprocessor-based unit
114 display
116 keyboard
118 mouse
120 selector
122 disk drive unit
124 compact disk-read only memory (CD-ROM)
126 floppy disk
127 network connection
128 printer
130 personal computer card (PC card)
132 PC card reader
134 digital camera
136 camera docking port
138 cable connection
140 wireless connection
160 original scene
170 ambient light source
180 flash light source
200 image processor
201 non-flash digital image
202 flash digital image
203 distance map
204 enhanced digital image
210 distance calculator
220 transform module The invention claim is:

1. A method for producing a distance map for a digital image captured by a digital camera, comprising:
   a) using the digital camera to capture two digital images of a scene under different illumination conditions caused by different light sources, wherein the scene includes a plurality of scene objects located at different distances from the digital camera, wherein one of the illumination conditions is ambient light and the other illumination condition is caused by the combination of ambient light and light from a source attached to the digital camera;
   b) producing a difference digital image by subtracting the two digital images one from another;
   c) using the difference digital image to produce a distance map of scene distance values, wherein the scene distance values are inversely proportional to the intensity values of the difference digital image and each scene distance value relates to the distance between the digital camera and a corresponding scene object; and
   d) using the distance map to enhance either or both digital images.

2. The method according to claim 1 wherein the two captured digital images are transformed into a log space.

3. The method according to claim 2 including using a known reference distance for a pixel in the scene and the calculated difference digital image to produce the distance map.

* * * * *